(12) United States Patent
Chalmers et al.

(10) Patent No.: US 12,567,077 B1
(45) Date of Patent: Mar. 3, 2026

(54) SYSTEMS AND METHODS FOR USER AFFILIATIONS IN METAVERSES

(71) Applicant: United Services Automobile Association (USAA), San Antonio, TX (US)

(72) Inventors: Timothy Blair Chalmers, San Antonio, TX (US); Robert Lee Black, San Antonio, TX (US); Subhalakshmi Selvam, Allen, TX (US); Shayla Leigh Callis, Simi Valley, CA (US); Roberto Virgillio Jolliffe, San Antonio, TX (US); Timothy Benjamin Czerlinsky, Dallas, TX (US); Sean Michael Wayne Craig, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 67 days.

(21) Appl. No.: 17/936,158

(22) Filed: Sep. 28, 2022

(51) Int. Cl.
| | |
|---|---|
| *G06Q 30/0201* | (2023.01) |
| *G06Q 30/0282* | (2023.01) |
| *G06T 19/00* | (2011.01) |

(52) U.S. Cl.
CPC ..... *G06Q 30/0201* (2013.01); *G06Q 30/0282* (2013.01); *G06T 19/00* (2013.01); *G06T 2219/024* (2013.01)

(58) Field of Classification Search
None
See application file for complete search history.

(56) References Cited

U.S. PATENT DOCUMENTS

| | | | |
|---|---|---|---|
| 8,219,616 B2 * | 7/2012 | Dawson | G06F 3/0484 |
| | | | 709/205 |
| 8,600,851 B1 * | 12/2013 | Pacheco | G06Q 40/04 |
| | | | 705/35 |
| 9,058,698 B2 * | 6/2015 | Jones | G06T 13/40 |

(Continued)

FOREIGN PATENT DOCUMENTS

| | | | | |
|---|---|---|---|---|
| JP | 2016512367 A | * | 4/2016 | G06F 40/00 |

OTHER PUBLICATIONS

Dionisio, John David N., William G. Burns Iii, and Richard Gilbert. "3D virtual worlds and the metaverse: Current status and future possibilities." ACM computing surveys (CSUR) 45.3 (2013): 1-38 (Year: 2013).*

(Continued)

*Primary Examiner* — Darlene Garcia-Guerra
(74) *Attorney, Agent, or Firm* — Fletcher Yoder P.C.

(57) ABSTRACT

The embodiments described herein relate to systems and methods for identifying and promoting user affiliations in metaverses. For example, a metaverse user affiliation system may be used to continuously monitor data relating to activity of a metaverse user with respect to one or more metaverses, to determine one or more user affiliations of the metaverse user based at least in part on the data relating to the activity of the metaverse user, to generate data relating to affiliation information based at least in part on the one or more user affiliations of the metaverse user, and to transmit the data relating to the affiliation information to the one or more metaverses to enable presentation of the affiliation information to the metaverse user via the one or more metaverses.

20 Claims, 12 Drawing Sheets

(56) References Cited

U.S. PATENT DOCUMENTS

| | | | | |
|---|---|---|---|---|
| 9,749,367 | B1 * | 8/2017 | Kirby | G06Q 10/101 |
| 10,462,079 | B2 * | 10/2019 | Wong | G06Q 50/01 |
| 11,241,629 | B2 * | 2/2022 | Tsao | G07F 17/3244 |
| 2006/0123127 | A1 * | 6/2006 | Littlefield | H04L 51/04 |
| | | | | 709/205 |
| 2008/0059570 | A1 * | 3/2008 | Bill | G06F 40/58 |
| | | | | 709/203 |
| 2009/0251457 | A1 * | 10/2009 | Walker | G06T 11/60 |
| | | | | 345/418 |
| 2013/0054366 | A1 * | 2/2013 | Roundtree | G06Q 30/0241 |
| | | | | 705/14.55 |
| 2013/0073539 | A1 * | 3/2013 | Bowser | G06F 16/9536 |
| | | | | 707/E17.014 |
| 2013/0143669 | A1 * | 6/2013 | Muller | A63F 13/795 |
| | | | | 463/42 |
| 2015/0261828 | A1 * | 9/2015 | Pappula | G06F 16/9535 |
| | | | | 707/749 |
| 2016/0246936 | A1 * | 8/2016 | Kahn | G16H 80/00 |
| 2017/0006343 | A1 * | 1/2017 | Miller | H04N 21/4524 |
| 2018/0165586 | A1 * | 6/2018 | Saxena | G06N 20/20 |
| 2018/0322518 | A1 * | 11/2018 | Kim | G06T 19/00 |
| 2019/0124471 | A1 * | 4/2019 | Chelnik | G06F 16/9535 |
| 2021/0135901 | A1 * | 5/2021 | Xie | H04L 12/4625 |
| 2022/0005275 | A1 * | 1/2022 | Atlas | G06F 3/0482 |
| 2022/0122328 | A1 * | 4/2022 | Giovannetti | G06T 7/70 |
| 2023/0223126 | A1 * | 7/2023 | Eberting | G06Q 30/0601 |
| | | | | 705/2 |
| 2023/0353404 | A1 * | 11/2023 | Mayfield | H04L 12/1822 |
| 2023/0410159 | A1 * | 12/2023 | Zavesky | G06Q 30/0201 |
| 2024/0022561 | A1 * | 1/2024 | Ingram | H04L 63/08 |

OTHER PUBLICATIONS

Eno, Joshua, Susan Gauch, and Craig Thompson. "Searching for the Metaverse." Proceedings of the 16th ACM symposium on virtual reality software and technology. 2009 (Year: 2009).*

Tayal, Swati, Kannan Rajagopal, and Vaishali Mahajan. "Virtual reality based metaverse of gamification." 2022 6th International Conference on Computing Methodologies and Communication (ICCMC). IEEE, 2022 (Year: 2022).*

* cited by examiner

SYSTEMS AND METHODS FOR USER AFFILIATIONS IN METAVERSES

BACKGROUND

The present disclosure relates generally to systems and methods for identifying and promoting user affiliations in metaverses.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

People are interacting with metaverses much more often nowadays. As such, they are able to experience an ever-increasing number of virtual worlds. However, these metaverses tend to be relatively insular, only presenting information to metaverse users that is specifically relevant to the particular metaverse. In contrast, metaverse users may wish to have access to different types of information when they are experiencing such metaverses. As such, there is a need to provide additional information within metaverses, which is not necessarily related to the subject matter of the metaverses. For example, such additional information may include information relating to other metaverse users interacting with the metaverses to, for example, promote affiliations with other metaverse users that have similar interests.

SUMMARY

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a method includes continuously monitoring, via a metaverse user affiliation system, data relating to activity of a metaverse user with respect to one or more metaverses. The method also includes determining, via a metaverse user affiliation system, one or more user affiliations of the metaverse user based at least in part on the data relating to the activity of the metaverse user. The method further includes generating, via the metaverse user affiliation system, data relating to affiliation information based at least in part on the one or more user affiliations of the metaverse user. In addition, the method includes transmitting, via the metaverse user affiliation system, the data relating to the affiliation information to one or more metaverse servers to enable presentation of the affiliation information to the metaverse user via the one or more metaverses.

In certain embodiments, a metaverse user affiliation system includes one or more processors configured to execute instructions stored in memory. The instructions, when executed by the one or more processors, are configured to cause the metaverse user affiliation system to continuously monitor data relating to activity of a metaverse user with respect to one or more metaverses, to determine one or more user affiliations of the metaverse user based at least in part on the data relating to the activity of the metaverse user, to generate data relating to affiliation information based at least in part on the one or more user affiliations of the metaverse user, and to transmit the data relating to the affiliation information to the one or more metaverses to enable presentation of the affiliation information to the metaverse user via the one or more metaverses.

In certain embodiments, a metaverse generation system includes a metaverse user affiliation system configured to continuously monitor data relating to activity of a metaverse user with respect to one or more metaverses. The metaverse user affiliation system is also configured to determine one or more user affiliations of the metaverse user based at least in part on the data relating to the activity of the metaverse user. The metaverse user affiliation system is further configured to generate data relating to affiliation information based at least in part on the one or more user affiliations of the metaverse user. In addition, the metaverse user affiliation system is configured to transmit the data relating to the affiliation information to enable presentation of the affiliation information to the metaverse user via the one or more metaverses. The metaverse generation system also includes one or more metaverse servers configured to receive the data relating to the affiliation information. The one or more metaverse servers are also configured to present the affiliation information to the metaverse user via the one or more metaverses.

BRIEF DESCRIPTION OF THE DRAWINGS

Various aspects of this disclosure may be better understood upon reading the following detailed description and upon reference to the drawings in which.

DETAILED DESCRIPTION

Figure 1:
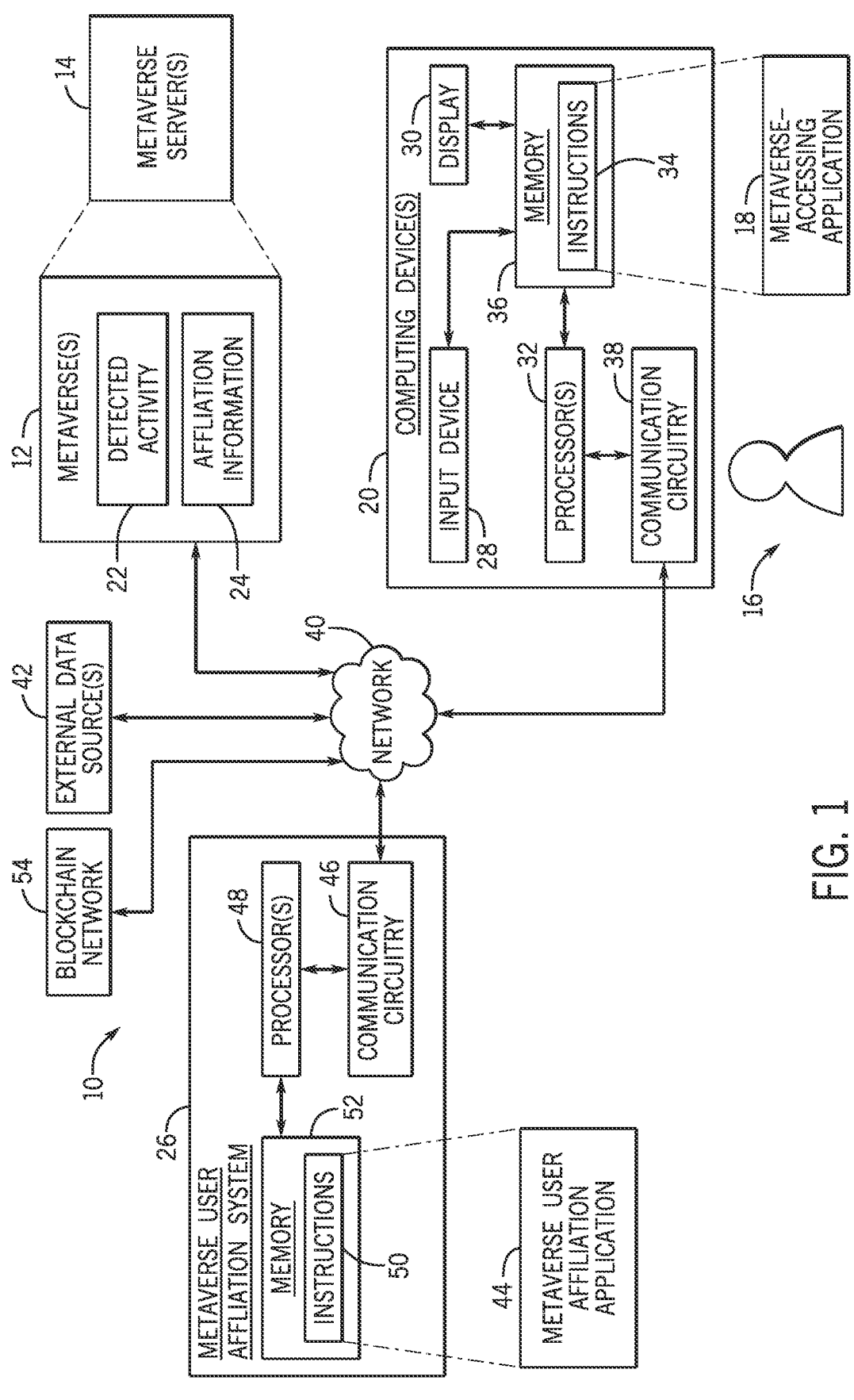
FIG. 1 is a schematic diagram of a metaverse generation system configured to enable interaction with metaverses, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

In the following description, for the purposes of explanation, numerous specific details are set forth in order to provide a thorough understanding of embodiments of the present disclosure. It will be apparent, however, to one skilled in the art that embodiments of the present disclosure may be practiced without some of these specific details.

As used herein, the term "application" refers to one or more computing modules, programs, processes, workloads, threads, and/or computing instructions executed by a computing system. Example embodiments of an application include software modules, software objects, software instances, and/or other types of executable code. As referred to herein, "user data" may include data associated with and/or identifying a user. In certain embodiments, user data may include data that relates to the actions performed by the user while utilizing a computing device, and/or with information associated with and/or identifying the user. For example, user data may include an indication of actions performed by the user (e.g., a website opened, cookies, an application accessed, a file downloaded, a link associated with a product that the user selected, a rating performed by the user such as an upvote or like, home or office temperature setting, preferred shows, light settings, activities, activity patterns, etc.), user identity data (e.g., IP address, email, and the like), or demographic information of the user (e.g., age, race, location, and the like).

As used herein, the term "insurance" refers to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, and other insurance policies known by those skilled in the art.

As used herein, terms "continuous" and "continuously" may refer to ongoing (e.g., iterative) actions that are performed without interruption or are performed with interruptions that take no longer than a relatively short period of time, such as no longer than a 5-second interruption between the ongoing actions, no longer than a 1-second interruption between the ongoing actions, and so forth. For example, continuous ongoing actions may be performed in an iterative manner such that there is no appreciable (e.g., human-perceivable) interruption of the iterative actions.

As used herein, the terms "automatic" and "automatically" refer to actions that are performed by a computing device or computing system (e.g., of one or more computing devices) without human intervention. For example, automatically performed functions may be performed by computing devices or systems based solely on data stored on and/or received by the computing devices or systems despite the fact that no human users have prompted the computing devices or systems to perform such functions. As but one non-limiting example, the computing devices or systems may make decisions and/or initiate other functions based solely on the decisions made by the computing devices or systems, regardless of any other inputs relating to the decisions.

The present disclosure relates generally to systems and methods for managing user affiliations in metaverses. In particular, in certain embodiments, a metaverse user affiliation system may be used to identify and promote affiliations between various users interacting with certain metaverses. For example, in certain embodiments, badges or other visual indications that may be displayed as being associated with an avatar of a user may be used to identify users within a metaverse who share a common interest or have a common background. For example, in certain embodiments, a particular badge may be associated with users that served in particular branches of military so that the users that are affiliated with this branch of the military may be able to easily identify other users within a metaverse so that they may more readily find and interact with each other. In certain embodiments, such badges or other visual indicators may only be visible in certain circumstances, for example, only to other users who share that particular affiliation. In addition, different various layers of privacy may be implemented. For example, some users (e.g., users that are associated with an organization that maintains or is otherwise directly associated with a particular metaverse, such as employees of an organization that hosts the particular metaverse) may be allowed to see certain information about users (e.g., years of service in the military, common geographical location(s), and so forth), whereas other users may not be able to see that same level of information.

Potential affiliations could include characteristics like whether the user is (or formerly was) a member of a particular branch of the military, whether the user is currently on active duty, whether the user works for a particular company, years of service of the user with the particular branch of the military and/or the particular company, year ranges that the user served with the particular branch of the military and/or the particular company, whether the user is a member of a particular religious organization, one or more educational institutions (e.g., high schools, universities, medical schools, law schools, vocational schools, and so forth) that the user attended, year ranges that the user attended the one or more educational institutions, whether the user graduated from the one or more educational institutions, net worth of the user, insurance information (e.g., insurance companies used, insurance policies with the insurance companies, and so forth) for the user, one or more hobbies of the user, the age of the user, the gender of the user, the race of the user, the marital status of the user, geographical information for the user (e.g., country, state, city, and so forth), one or more physical disabilities of the user, and so forth. It will be appreciated that some of these characteristics may be of the type that users may not offer to the general public, but which could be very important to a particular user such that they would like to know when other users with similar affiliations are in there vicinity within particular metaverses such that they may interact with the other users. In addition, the particular user may be interested in learning what other types of services, experiences, and so forth, other users with similar affiliations have spent a lot of time interacting with in certain metaverses. As such, the embodiments described herein may enable the sharing of information between users with similar affiliations that might otherwise be impossible (or, at least very difficult, in a context other than a metaverse).

To that end, in certain embodiments, users may manually tag certain affiliations as having different privacy levels, for example, public affiliations (e.g., where all other metaverse users can see the affiliations for a particular user), private affiliations (e.g., where no other metaverse users can see the affiliations for a particular user), similar affiliations (e.g., where other metaverse users that share the affiliations can see the affiliations for a particular user), and other privacy levels. Furthermore, in certain embodiments, information relating to detected metaverse activity of other users having similar affiliations may be freely viewable (albeit, anonymously) even if the particular users associated with the detected metaverse activity do not wish for their particular identities to be known. As such, the embodiments described herein enable a greater amount of affiliation-related information to be distributed even if the users sharing the affiliations do not know each other's particular identities. Indeed, in certain embodiments, the detected metaverse activity may be somewhat general in nature, such as detection that users that used to be with a particular branch in the military tend to spend an inordinate amount of time in a particular area of a metaverse. Such information may be beneficial to a user sharing that affiliation, despite the fact that they are presented with this information without knowing any users for which the metaverse activity was collected.

In addition, in certain embodiments, alerts may be provided to users when there are other users who share affiliations are in relative proximity within a particular metaverse. For example, if a particular user is a former Marine and there is another user that is also a former Marine within 5 feet, an alert may be provided. It will be appreciated that every user may have many different characteristics that define them. As such, getting these different badges or other visual indications to show up as part of their avatars may take up a lot of space. As such, in certain embodiments, to minimize the display of such badges and other visual indications, only relevant badges or other visual indications may be visible to other users, for example, those that are indicative of shared affiliations between the users. In addition, in certain embodiments, certain affiliation information may be blurred out under certain circumstances.

In addition, in certain embodiments, an authentication component could be utilized to ensure that all affiliations noted by users are correct. For example, if a particular user says they are a former Marine, the system may authenticate that the user is, indeed, a former Marine. Furthermore, in certain embodiments, the system may analyze detected metaverse activity for users having similar affiliations to determine whether these affiliated users are visiting similar areas of metaverses, interacting with similar services provided within the metaverses, and so forth.

In addition, in certain embodiments, the system may use proximity of users in a metaverse to represent an affiliation. For example, example, users associated with a particular organization may primarily be found in particular areas of a metaverse such that other users may see these affiliated users as the particular organization. Indeed, in certain embodiments, the affiliated users associated with the particular organization may be visualized as being located within different buildings within the metaverse (e.g., as separate but related entities) that, for example, relate to different services provided by the organization. In addition, in certain embodiments, external partners associated with the particular organization may also be represented in the metaverse.

In addition, in certain embodiments, a virtual complex may be represented in a metaverse to show different subdivisions within the particular organization to which certain users are affiliated. For example, in certain embodiments, a virtual bank may be represented as a banking subdivision of the particular organization, a virtual insurance office may be represented as an insurance subdivision of the particular organization, or a virtual counseling office may be represented as a counseling subdivision of the particular organization, and so forth, as separate virtual buildings associated with the particular organization and represented in the metaverse. Furthermore, in certain embodiments, external partners associated with the particular organization may also have virtual buildings represented in close proximity to the virtual complex of the particular organization. In addition, in certain embodiments, fast travel points may be represented virtually with the metaverse to enable users to fast travel to certain locations associated with the particular organization (e.g., through virtual portals).

In addition, in certain embodiments, different levels of hierarchy of the particular organization may be virtually represented in the metaverse (e.g., which divisions certain users are affiliated with, where in the real world geographically the users are actually located, and so forth). In addition, in certain embodiments, the virtual world (e.g., the virtual complex associated with the particular organization) may be changed based on the context of an interest of the user interacting with the particular organization. For example, the virtual world could be modified such that only subdivisions of interest to the user are virtually represented in the virtual world.

In addition, in certain embodiments, an incentivization component may be utilized wherein users could be paid money (or otherwise rewarded, for example, by acquiring points) to wear virtual apparel in the metaverse as advertising. In other embodiments, only users that have performed certain tasks (e.g., taking training classes) may be rewarded with certain virtual apparel. Furthermore, in certain embodiments, certain virtual apparel or virtual badges may be awarded to certain users based on long time service (e.g., receiving a virtual 50-year sticker for 50 years of service with the particular organization). In addition, in certain embodiments, users may be rewarded with real-world rewards based on points rewarded in the metaverse.

FIG. 1 is a schematic diagram of a metaverse generation system 10 configured to enable interaction with various metaverses 12 that are maintained by various metaverse-providing entities, for example, via metaverse servers 14 that enable users 16 to interact with the metaverses 12 via metaverse-accessing applications 18 executable via computing devices 20 used by the users 16. In certain embodiments, the computing devices 20 may include any computing devices 20 configured to execute the metaverse-accessing applications 18 including, but not limited to, smart phones, computing tablets, personal computers (PCs), laptop computers, wearable computing devices, and so forth. In certain embodiments, each computing device 20 may be registered with the metaverses 12 by, for example, registering the computing device 20 (e.g., using a universally unique identifier (UUID), media access control (MAC) address, and so forth) with a user account (e.g., using a unique user identification number) associated with a particular user 16. Therefore, interaction with the metaverse-accessing application 18 by a particular user 16 via a particular computing device 20 may be automatically associated with that user 16.

For example, as described in greater detail herein, certain detected activity 22 of a particular user 16 within one or more metaverses 12 may be continuously monitored for the purpose of determining affiliations with other users 16 that also interact with the one or more metaverses 12 such that affiliation information 24 may be provided to the particular user 16 while they are interacting with the one or more metaverses 12. In certain embodiments, the detected activity 22 may include the users 16 themselves manually entering data relating to characteristics of the users (e.g., by using one or more computing devices 20) or may include activity of the users 16 within one or more metaverses 12, which may be automatically tracked and transmitted to a metaverse user affiliation system 26, which may in turn determine affiliations between users 16, and provide the users 16 with affiliation information 24 relating to these determined affiliations, as described in greater detail herein.

The detected activity 22 of a particular user 16 with respect to particular metaverses 12 (e.g., which may be monitored by a metaverse-accessing application 18 being used by the particular user 16, by a metaverse 12 being accessed using the metaverse-accessing application 18 being used by the particular user 16, by a metaverse server 14 hosting the metaverse 12 being accessed using the metaverse-accessing application 18 being used by the particular user 16, or some combination thereof) may be transmitted to the metaverse user affiliation system 26, which uses the detected activity 22 to automatically present affiliation information 24 relating to certain user affiliations between the particular user 16 and other users 16 of the particular metaverses 12, as described in greater detail herein. For example, as will be appreciated, the metaverse-accessing application 18 being executed on a computing device 20 associated with the user 16 may be accessed by the user 16 to access a particular metaverse 12. In addition, the user 16 may initiate certain activity 22 with respect to the particular metaverse 12, as described in greater detail herein, via interaction with the metaverse-accessing application 18 using the computing device 20. For example, manipulation of one or more input devices 28 (e.g., keyboards, mice, buttons, touch screens, and so forth) of the computing devices 20 may enable the users 16 to interact with the metaverse-accessing application 18, which may be displayed on one or more displays 30 (e.g., light emitting diode (LED) displays, organic LED (OLED) displays, and so forth) of the computing devices 20. In certain embodiments, the users 16 may login to particular computing devices 20 such that user identifiers (e.g., user identification numbers) may be tracked to associate detected activity 22 with the particular user 16.

As illustrated in FIG. 1, in certain embodiments, the computing devices 20 may also include processing circuitry such as one or more processors 32 configured to execute instructions 34 stored in memory media 36 of the respective computing device 20, wherein the instructions 34, when executed by the one or more processors 32, enable the respective computing device 20 to track activity 22 (e.g., interaction with the metaverse-accessing application 18, as well as other web pages, applications, and so forth) of a user 16 using the respective computing device 20, as described in greater detail herein.

In certain embodiments, the one or more processors 32 of the computing devices 20 may be any suitable type of computer processors or microprocessors capable of executing computer-executable code. In certain embodiments, the memory media 36 of the computing devices 20 may be any suitable articles of manufacture that can serve as media to store processor-executable code, data, or the like. These articles of manufacture may represent computer-readable media (e.g., any suitable form of memory or storage) that may store processor-executable code (e.g., the instructions 34) executed by the one or more processors 32 to perform the presently disclosed techniques. In certain embodiments, the memory media 36 of the computing devices 20 may represent tangible, non-transitory computer-readable media (e.g., any suitable form of memory or storage) that may store the processor-executable code used by the one or more processors 32 to perform various techniques described herein. It should be noted that non-transitory merely indicates that the media is tangible and not a signal. It should be noted that the components described above with regard to the computing devices 20 are exemplary components, and the computing devices 20 may include additional or fewer components in certain embodiments.

In addition, in certain embodiments, the computing devices 20 may also include communication circuitry 38 configured to facilitate communication between the respective computing device 20 and the metaverse user affiliation system 26 (as well as with the metaverse server(s) 14) to facilitate interaction of the respective computing device 20 with the metaverses 12 described herein. For example, in certain embodiments, the computing devices 20 may transmit data relating to detected activity 22 with respect to metaverses 12 to the metaverse server(s) 14 and/or the metaverse user affiliation system 26 to facilitate interaction of users 16 associated with the computing devices 20 with the metaverses 12, as described in greater detail herein. In certain embodiments, the communication circuitry 38 may facilitate communications using Wi-Fi, near field communication, Bluetooth, Zigbee, radio frequency identification (RFID) tags and/or readers, an embedded wireless module, and/or another suitable wired or wireless communication network 40.

In addition, in certain embodiments, as described in greater detail herein, external data sources 42 may be used to collect data relating to users 16 that may be used by the metaverse server(s) 14 and/or the metaverse user affiliation system 26 to determine what affiliation information 24 to present to the users 16 via the metaverses 12, as described in greater detail herein. In certain embodiments, the external data sources 42 may include, but are not limited to, merchants, financial institutions, rideshare apps, rental car companies, travel agencies, airlines, hospitality organizations, and so forth, which may be interacted with by the users 16, for example, either via applications (e.g., the metaverse-accessing application 18 or other applications) being executed on computing devices 20 associated with the user 16 or in person. As will be appreciated, commercial activity 22 with these external data sources 42 may also be communicated to the metaverse server(s) 14 and/or the metaverse user affiliation system 26 via the communication network 40.

In response to receiving data relating to detected activity 22 of a user 16 from one or more computing devices 20, metaverse servers 14, and/or external data sources 42, the metaverse user affiliation system 26 may utilize a metaverse user affiliation application 44 to analyze the data relating to the detected activity 22 to automatically present affiliation information 24 relating to certain user affiliations between the user 16 and other users 16 of the particular metaverses 12, as described in greater detail herein.

In certain embodiments, the metaverse user affiliation system 26 may include communication circuitry 46 configured to facilitate communication between the metaverse user affiliation system 26 and the computing devices 20, the metaverse servers 14, and/or the external data sources 42, as described in greater detail herein. For example, as described in greater detail herein, in certain embodiments, the metaverse user affiliation system 26 may receive data relating to activity 22 of users 16 from one or more computing devices 20, one or more metaverse servers 14, and/or one or more external data sources 42 via the communication network 40, and may automatically present affiliation information 24 relating to certain user affiliations between particular users 16 of the particular metaverses 12, as described in greater detail herein. In particular, the metaverse user affiliation system 26 may transmit the affiliation information 24 to the metaverse servers 14 to enable the metaverse servers 14 to present the affiliation information 24 via the metaverses 12 maintained by the metaverse servers 14. Furthermore, in certain embodiments, the specific data relating to the activity 22 of the users 16 that is received by the metaverse user affiliation system 26 and/or the specific data relating to the affiliation information 24 that is transmitted by the metaverse user affiliation system 26 may be converted by the metaverse user affiliation system 26 into certain data types and data protocols that facilitate both efficient storing of the data, as well as streamlined data processing (e.g., by converting certain otherwise incompatible data types so that they can be more easily processed and analyzed, for example, by the metaverse servers 14 described herein). In certain embodiments, the communication circuitry 46 may facilitate communications using Wi-Fi, near field communication, Bluetooth, Zigbee, radio frequency identification (RFID) tags and/or readers, an embedded wireless module, and/or another suitable wired or wireless communication network 40.

As illustrated in FIG. 1, in certain embodiments, the metaverse user affiliation system 26 may include other processing circuitry such as one or more processors 48 configured to execute instructions 50 stored in memory media 52 of the metaverse user affiliation system 26, wherein the instructions 50, when executed by the one or more processors 48, enable the metaverse user affiliation system 26 to perform the functions described in greater detail herein. In certain embodiments, the one or more processors 48 of the metaverse user affiliation system 26 may be any suitable type of computer processors or microprocessors capable of executing computer-executable code. In certain embodiments, the memory media 52 of the metaverse user affiliation system 26 may be any suitable articles of manufacture that can serve as media to store processor-executable code, data, or the like. These articles of manufacture may represent computer-readable media (e.g., any suitable form of memory or storage) that may store processor-executable code (e.g., the instructions 50) executed by the one or more processors 48 to perform the presently disclosed techniques.

In certain embodiments, the memory media 52 of the metaverse user affiliation system 26 may also be used to store data relating to detected activity 22 of users 16, as described in greater detail herein. In certain embodiments, the memory media 52 of the metaverse user affiliation system 26 may represent tangible, non-transitory computer-readable media (e.g., any suitable form of memory or storage) that may store the processor-executable code used by the one or more processors 48 to perform various techniques described herein. It should be noted that non-transitory merely indicates that the media is tangible and not a signal. It should be noted that the components described above with regard to the metaverse user affiliation system 26 are exemplary components, and the metaverse user affiliation system 26 may include additional or fewer components in certain embodiments.

In addition, in certain embodiments, the metaverse user affiliation system 26 may function as an execution layer (e.g., as plug-in software) that any and all software applications interacting with the metaverses 12 may utilize to enable the metaverse user affiliation system 26 to capture metaverse activity 22 and determine affiliation information 24 to transmit back to the metaverses 12, as described in greater detail herein. Indeed, in certain embodiments, the metaverse user affiliation system 26 may be deployed as a cloud-based metaverse user affiliation network to facilitate decentralized management of the metaverse user affiliations described herein.

As such, a metaverse-accessing application 18 being executed on a computing device 20 associated with a particular user 16, various metaverse servers 14, and/or external data sources 42 may monitor activity 22 of the particular user 16, and the data relating to this monitored activity 22 may be used by the metaverse user affiliation system 26 to automatically present affiliation information 24 relating to certain user affiliations between the particular user 16 and other users 16 of the particular metaverses 12, as described in greater detail herein. For example, in certain embodiments, the data relating to the monitored activity 22 of the user 16 may include interactions that the user 16 has performed in a particular metaverse 12 with which the user 16 is currently interacting via the metaverse-accessing application 18. In addition, in certain embodiments, the data relating to the monitored activity 22 of the user 16 may include external data from the external data sources 42 relating to prior activity 22 of the user 16, which may be relevant to the generation and presentation of specific affiliations for the particular user within the particular metaverse 12.

It will be appreciated that the metaverse data transmitted by the metaverse user affiliation system 26 to metaverse servers 14 to enable the metaverse servers 14 to present the metaverse data in the metaverses 12 maintained by the metaverse servers 14 may include specific virtual objects to be presented, specific locations within the metaverses 12 at which the virtual objects should be presented, specific time periods (e.g., special events) during which the virtual objects should be presented, specific data to be presented in connection with the virtual objects, specific interactions that should be enabled relative to the virtual objects, and so forth. In addition, the metaverse data that is transmitted to metaverse servers 14 by the metaverse user affiliation system 26 may be determined in accordance to rules set by the metaverse servers 14. For example, certain metaverses 12 may be allowed by the metaverse servers 14 to locate virtual objects only in certain virtual areas within the metaverses 12 maintained by the metaverse servers 14. As such, the metaverse data transmitted by the metaverse user affiliation system 26 must comply with these restrictions.

Figure 2:
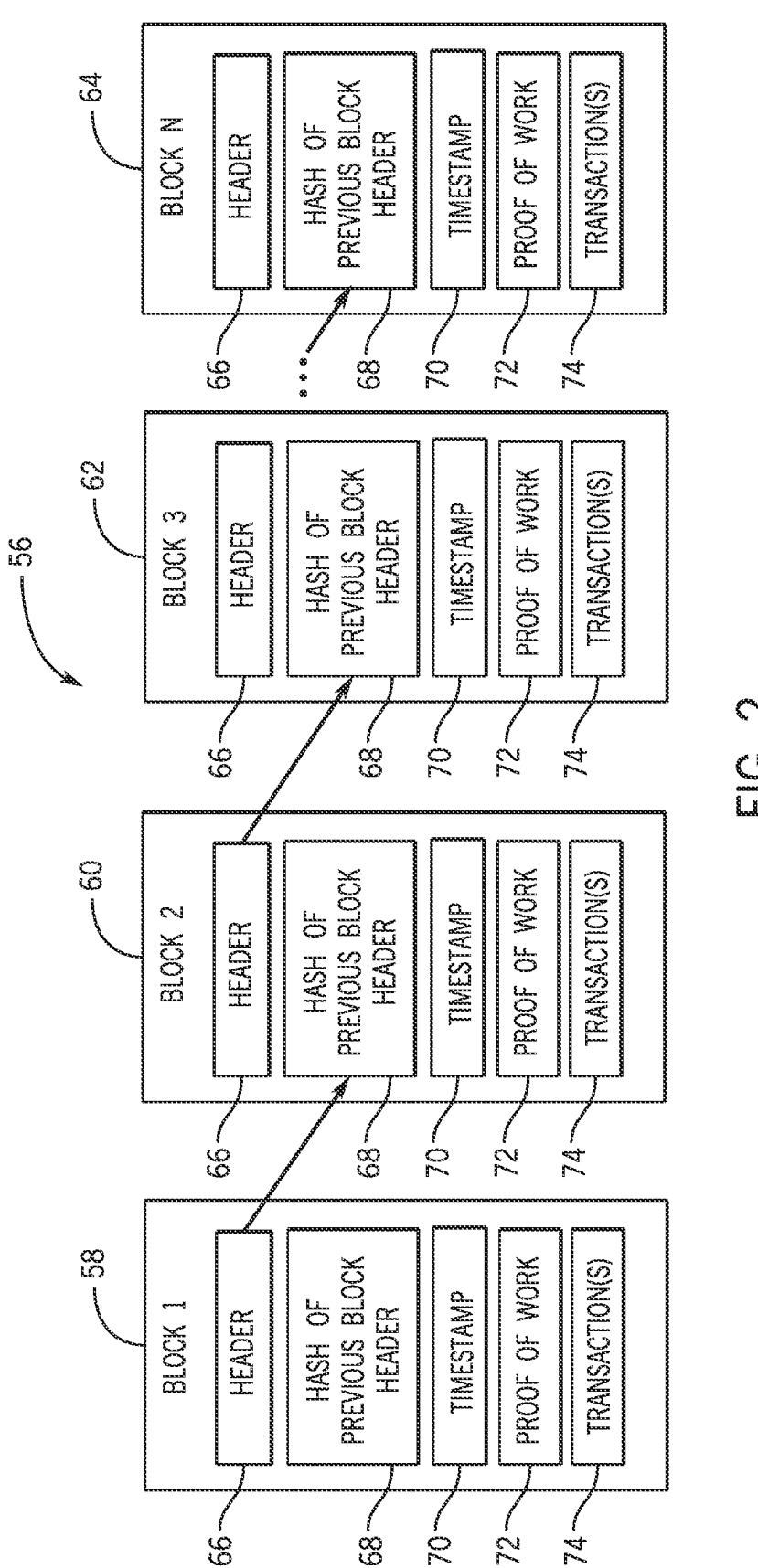
FIG. 2 illustrates a block diagram of a blockchain of a blockchain network of FIG. 1, in accordance with embodiments described herein.

As described in greater detail herein, any and all of the data received, generated, and/or transmitted by the metaverse user affiliation system 26 described herein may be stored by the metaverse user affiliation system 26 in a distributed ledger (e.g., a blockchain network) 54. FIG. 2 illustrates a block diagram of a blockchain 56 of the blockchain network 54 of FIG. 1. In the illustrated embodiment, the blockchain 56 is illustrated as having multiple blocks 58, 60, 62, and 64. The block 58 (first block in the blockchain 56) may have been created and allocated as a special starting block. The block 58 may include a unique header 66 uniquely identifying the block 58 from other blocks in the blockchain 56. Because the block 58 is the first block in the blockchain 56, a hash of a previous block header 66 may be set to zero. A timestamp 70 may include the date of creation for the block 58, and a proof of work section 72 may include certain "work" that proves that a "miner" has performed work suitable for the creation of the block 58 and/or to verify transactions in the blockchain 56. The work section 72 may vary based on a protocol used to create the blockchain 56. For example, a bitcoin protocol may use a Merkle tree. The Merkle tree may be a tree data structure in which every leaf node is labelled with a hash (e.g., one-way hash) of a data block, and every non-leaf node is labelled with a cryptographic hash of the labels of its child nodes. Because of the one-way transformation used in hashing, the Merkle tree has the property that there is no known technique that a deceptive party could use to guess a value that would hash with a second-to-last value to create the Merkle root, which is know from a verified blockchain 56, and so on, down the tree. In other words, there is no way to create a fake value that would hash to an expected Merkle tree value (e.g., value stored in work section 72 of the block 58), thus creating a single value that proves the integrity of all of the transactions under it. Transactions, such as transactions relating to interaction with the metaverses 12 described herein, may be stored in a transactions section 74. Data related to the particular transaction may also be stored in section 74 (or in another section).

When a new block is created, the block will receive a new header 66 uniquely identifying the new block. As described in greater detail herein, a peer-to-peer network may include multiple "miners" that add blocks to the blockchain 56 based on the blockchain protocol. In general, multiple miners validate transactions 74 that are to be added to a block, and compete (e.g., perform computing work, as introduced above) to have their respective block added to the blockchain 56. Validation of transactions includes verifying digital signatures associated with respective transactions 74. For a block to be added to the blockchain 56, a miner must demonstrate a proof of work before their proposed block of transactions is accepted by the peer-to-peer network, and before the block is added to the blockchain 56. In certain embodiments, a blockchain protocol include a proof of work scheme (e.g., Merkle Tree) that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In certain embodiments, the hash value is a one-way hash value such that the output hash value cannot be "unhashed" to determine what the input was. In certain embodiments, the blockchain protocol may require multiple pieces of information as input to the CHF. For example, the input to the CHF may include a reference to the previous (most recent) block (e.g., hash 68) in the blockchain 56, details of the transaction(s) 74 that are to be included in the to-be-created block, and a "nonce" value (e.g., a random number used only once).

Multiple nodes may compete to hash a set of transactions, and to provide the next block that is to be added to the blockchain 56. In certain embodiments, the blockchain protocol may provide a threshold hash to qualify a block to be added to the blockchain 56. For example, the threshold hash may include a predefined number of zeros (0s) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in the peer-to-peer network receives transaction information for one or more transactions that are to be included in a block that is to be added next in the blockchain 56. Each miner provides the reference to the previous (most recent) block in the blockchain 56, details of the transaction(s) 74 that are to be included in the to-be-created block, and the nonce value to the CHF that may then be used to provide a hash value. If the hash value does not meet the threshold hash (e.g., the first four characters of the hash value are not each zero), the miner starts again to provide another hash value, thus increasing the amount of work. Alternatively, if the hash value meets the threshold hash (e.g., at least the first four characters of the hash value are each zero), the respective miner may have successfully created the next block that is to be added to the blockchain 56. Consequently, the respective miner's block is broadcast across the peer-to-peer network. At this point, all other miners cease work (because one miner was already successful), and all copies of the blockchain 56 are updated across the peer-to-peer network to append the block to the blockchain 56. Each miner may produce hundreds of thousands (or more) of hash values, before any one miner provides a qualifying hash value (e.g., at least the first four characters of the hash value are each zero).

It is to be noted that any computing device 20 may be miners. Accordingly, for example, as new data is created, new blocks may be added to the blockchain 56, including blocks 58, 60, 62, and 64. Indeed, the blockchain 56 may continue to grow, storing new data as it becomes available. Because of the distributed nature of the peer-to-peer network created via the blockchain network 54, each node may include copies of the blockchain 56 and share copies of the blockchain 56 as new peers enter the peer-to-peer network. Each copy of the blockchain 56 may include verified information for all or substantially all of the data tracked by the blockchain network 54. The information is secure, immutable, and more efficiently tracked as new added gets added via the blockchain network 54.

Figure 3:
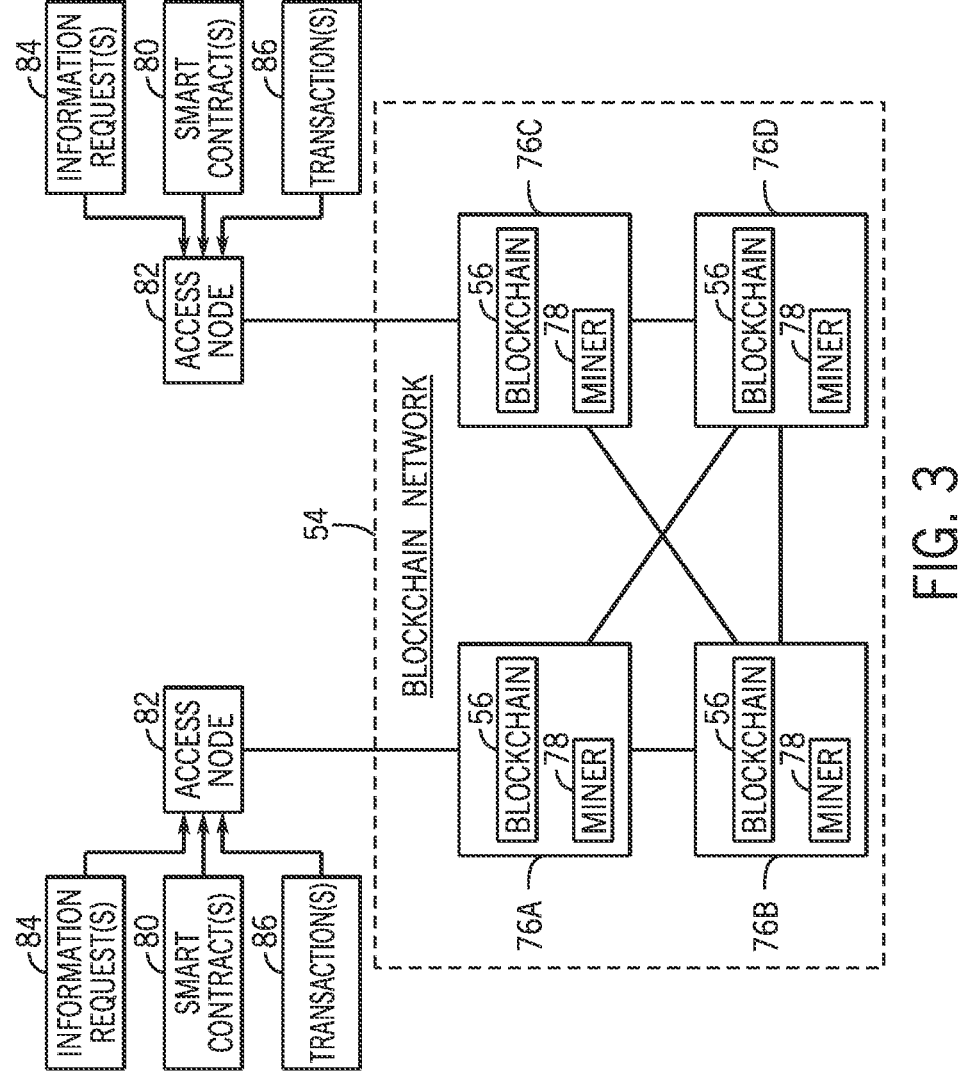
FIG. 3 illustrates a block diagram of a portion of the metaverse generation system of FIG. 1, which may be used to manage data relating to user affiliations within metaverses using a distributed ledger (e.g., blockchain network), in accordance with embodiments described herein.

FIG. 3 illustrates a portion of the metaverse generation system 10 of FIG. 1, which may be used to manage data relating to metaverses 12 using a distributed ledger (e.g., blockchain network) 54, in accordance with embodiments described herein. As described herein, the blockchain network 54 may be formed by several blockchain nodes, such as blockchain nodes 76A, 76B, 76C, and 76D, which may be implemented by a dedicated server or computer device, or may be implemented as a virtual machine in a shared computer system. Each blockchain node 76A-D may have in its memory a replicate of the blockchain 56. Each blockchain node 76A-D may also have a miner 78, an application that may verify the integrity of the blockchain 56, and may also perform operations and/or transactions using smart contracts 80 associated with the blockchain 56. As described herein, the blockchain 56 is a replicated data structure that may have its consistency and integrity preserved by a consensus mechanism performed by the miners 78.

Users may interact with the blockchain network 54 via an access node 82. For example, users may request, through the access node 82, the recordation and/or processing of data (e.g., using a smart contract 80), such as an information request 84 (e.g., a request for the state of a smart contract 80), or a transaction request 86 (e.g., a request for a change in a state of the smart contract 80) to the blockchain 56. The smart contracts 80, information requests 84, and/or transaction requests 86 allow users to record certain data relating to interaction with the metaverses 12 described herein. Each access node 82 may be implemented by a computer terminal coupled to the blockchain network 54.

A miner 78 from any of the blockchain nodes 76A, 76B, 76C, and 76D may create an update to the blockchain 56. In certain embodiments, the smart contract(s) 80 may be a data structure that may include states (e.g., internal states) and transaction instructions relating to the data stored in the blockchain 56. The transactions, or functions, may include instructions that modify the states of the smart contracts 80 and/or interact with other smart contracts 80 by performing further transactions. Examples of smart contracts 80 described herein include smart contracts 80 related to storing data relating to interaction with the metaverses 12 described herein. Following insertion of a smart contract 80, the blockchain node 76 may propagate its update of the blockchain 56, and the other blockchain nodes 76 may accept the update using a consensus mechanism (e.g., proof of work, proof of stake, and so forth). For example, if blockchain node 76A generated a blockchain segment that incorporates some smart contract 80 to the blockchain 56, blockchain node 76A may propagate the updated blockchain 56 to blockchain nodes 76B, 76C, and 76D, which may validate and accept the updated blockchain 56.

Similarly, a transaction request 86 may be received by any miner 78 of the blockchain nodes 76A, 76B, 76C, and 76D via an access node 82. The transaction request 86 may perform operations that cause a change in the state of a smart contract 80 recorded in the blockchain 56. After performing the desired operations, and changing the state of the smart contract 80, in accordance with the transaction request 86, the miner 78 may update the blockchain 56 to record the updated state of the smart contract 80. The updated state of the smart contract 80 may be propagated to the blockchain nodes 76A-D, verified, and persisted using consensus mechanisms. An information request 84, similar to a transaction request 86, may be received by a miner 78, and may perform operations associated with a smart contract 80. However, in contrast with the transaction request 86, the information request 84 does not lead to changes in the state of the smart contract 80 and, thus, updates to the blockchain 56 that result from a successful information request 84 are not performed.

In certain embodiments, performance of the operations by the miners 78 of the blockchain nodes 76 may be incentivized and/or regulated by exchange of tokens (e.g., currencies) of the blockchain 56. For example, in public blockchains, updates to the blockchain 56 by a blockchain node 76A-D may be rewarded with a blockchain token. Moreover, performance of a transaction request 86 or an information request 84 may be rewarded with a blockchain token. For example, in certain embodiments, in the Ethereum public blockchain, updates to the blockchain from recordation of smart contracts 80 and information requests 84 may be rewarded with Ether tokens, and performance of transaction requests 86 and information requests 84 may be incentivized by offers of Ethers in the form of a secondary token called "gas". In certain private blockchain embodiments, tokens may be used to implement prioritization mechanisms for the operations and/or to prevent large or faulty operations from blocking the blockchain 56 with arbitrarily long operation times.

Figure 4:
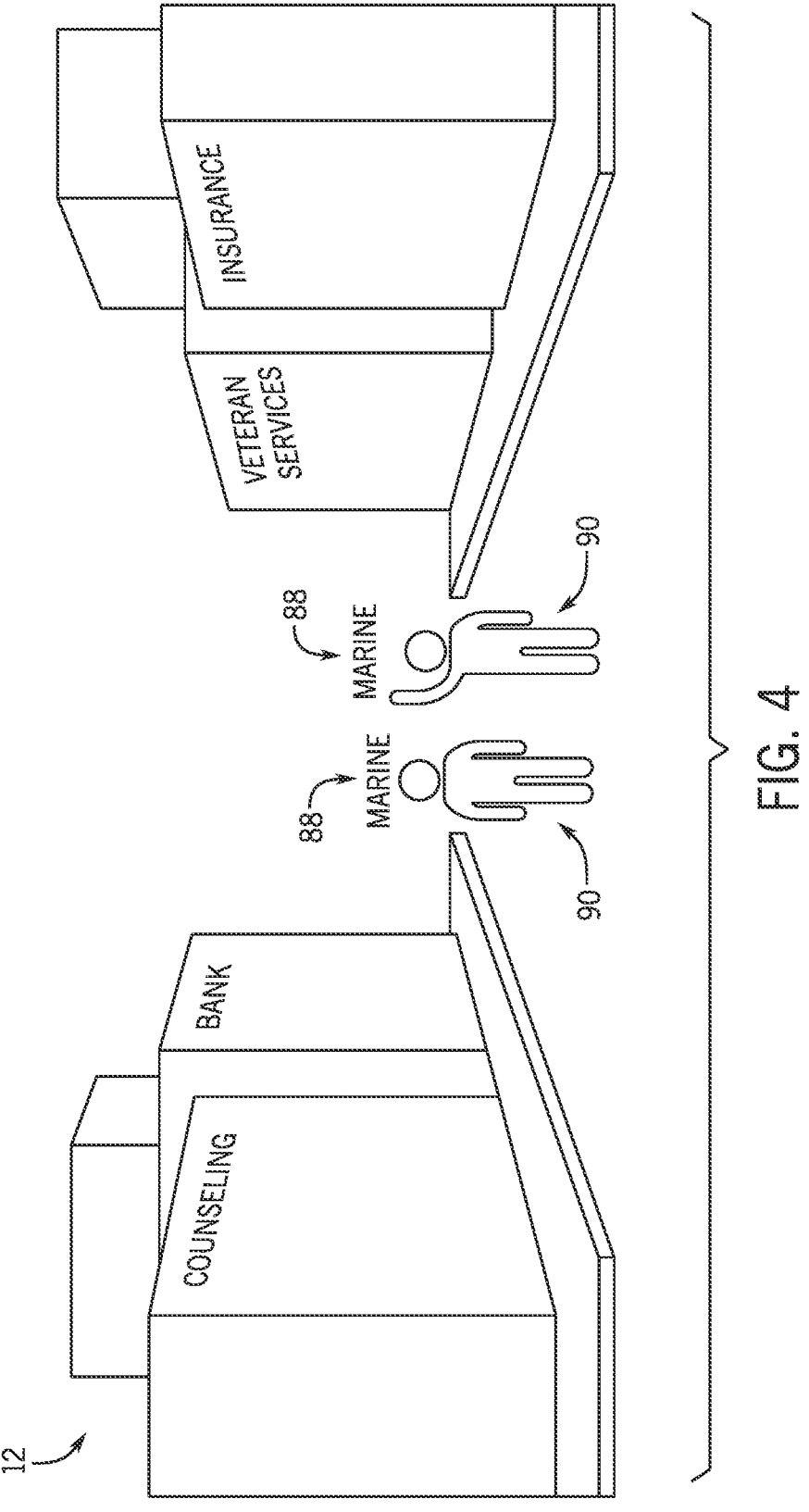
FIG. 4 illustrates metaverse users having badges that denote shared affiliations, in accordance with embodiments described herein.

As described above, the embodiments described herein enable management of user affiliations in metaverses 12. In particular, in certain embodiments, a metaverse user affiliation system 26 may be used to identify affiliations between various users 16 interacting with certain metaverses 12, and may promote such identified affiliations in a variety of different ways, as described in greater detail herein. For example, as illustrated in FIG. 4, in certain embodiments, badges 88 (or other visual indications) that may be displayed as being associated with an avatar 90 of a user 16 may be used to identify users 16 within a metaverse 12 who share a common interest or have a common background. For example, in certain embodiments, a particular badge 88 may be associated with users 16 that served in particular branches of military so that the users 16 that are affiliated with this branch of the military may be able to easily identify other users 16 within a metaverse 12 so that they may more readily find and interact with each other. In certain embodiments, such badges 88 (or other visual indicators) may only be visible in certain circumstances, for example, only to other users 16 who share that particular affiliation. In addition, different various layers of privacy may be implemented by the metaverse user affiliation system 26. For example, some users 16 (e.g., users 16 that are associated with an organization that maintains or is otherwise directly associated with a particular metaverse 12, such as employees of an organization that hosts the particular metaverse 12) may be allowed to see certain information about users 16 (e.g., years of service in the military, common geographical location(s), and so forth), whereas other users 16 may not be able to see that same level of information.

Potential affiliations could include characteristics like whether the user 16 served in the military, whether the user 16 is (or formerly was) a member of a particular branch of the military, whether the user 16 is currently on active duty with the particular branch of the military, whether the user 16 works for a particular company, years of service of the user 16 with the particular branch of the military and/or the particular company, year ranges that the user 16 served with the particular branch of the military and/or the particular company, whether the user 16 is a member of a particular religious organization, one or more educational institutions (e.g., high schools, universities, medical schools, law schools, vocational schools, and so forth) that the user 16 attended, year ranges that the user 16 attended the one or more educational institutions, whether the user 16 graduated from the one or more educational institutions, net worth of the user 16, insurance information (e.g., insurance companies used, insurance policies with the insurance companies, and so forth) for the user 16, one or more hobbies of the user 16, the age of the user 16, the gender of the user 16, the race of the user 16, the marital status of the user 16, geographical information for the user 16 (e.g., country, state, city, and so forth), one or more physical disabilities of the user 16, or any other characteristics that may either be manually entered by the user 16 them self (e.g., by using one or more computing devices 20) or that may be automatically detected via interaction of the user 16 with one or more metaverses 12 using one or more metaverse-accessing applications 18 running on one or more computing devices 20 (with the metaverse-accessing applications 18, the metaverses 12, the metaverse servers 14, the metaverse user affiliation system 26, or some combination thereof, automatically detecting the activity 22 of the user 16).

In certain embodiments, the characteristics of the users 16 may function as the affiliations themselves. However, in other embodiments, the characteristics of the users 16 may merely be used by the metaverse user affiliation system 26 to determine the affiliations. For example, in certain embodiments, an affiliation determined by the metaverse user affiliation system 26 may be all users 16 over the age of 65 that served in the military. As such, in certain embodiments, different combinations of characteristics of the users 16 may be used by the metaverse user affiliation system 26 to determine different affiliations for the users 16.

It will be appreciated that some of the characteristics (e.g., that may be used to determine their affiliations) tracked by the metaverse user affiliation system 26 may be of the type that users 16 may not offer to the general public, but which could be very important to a particular user 16 such that they would like to know when other users 16 with similar affiliations are in there vicinity within particular metaverses 12 such that they may interact with the other users 16. In addition, the particular user 16 may be interested in learning what other types of services, experiences, and so forth, other users 16 with similar affiliations have spent a lot of time interacting with in certain metaverses 12. As such, the embodiments described herein may enable the sharing of information between users 16 with similar affiliations that might otherwise be impossible (or, at least very difficult, in a context other than a metaverse 12).

Figure 5:
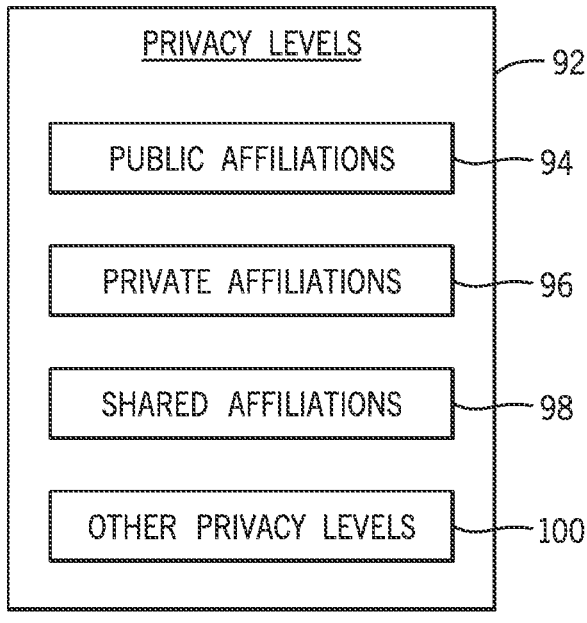
FIG. 5 illustrates various privacy levels for user affiliations, in accordance with embodiments described herein.

To that end, as illustrated in FIG. 5, in certain embodiments, users 16 may manually tag certain affiliations as having different privacy levels 92, for example, public affiliation privacy levels 94 (e.g., where all other metaverse users 16 can see the affiliations for a particular user 16), private affiliation privacy levels 96 (e.g., where no other metaverse users 16 can see the affiliations for a particular user 16), shared affiliation privacy levels 98 (e.g., where other metaverse users 16 that share the affiliations can see the affiliations for a particular user 16), and other privacy levels 100. It will be appreciated that the particular privacy levels 92 set for particular affiliations may be manually selected by the users 16 to which the affiliation data relates, such that the users 16 may protect any affiliation information they do not wish to share. Indeed, in certain embodiments, each of the affiliations for a particular user 16 may be set to a private affiliation privacy level 96 by default.

Figure 6:
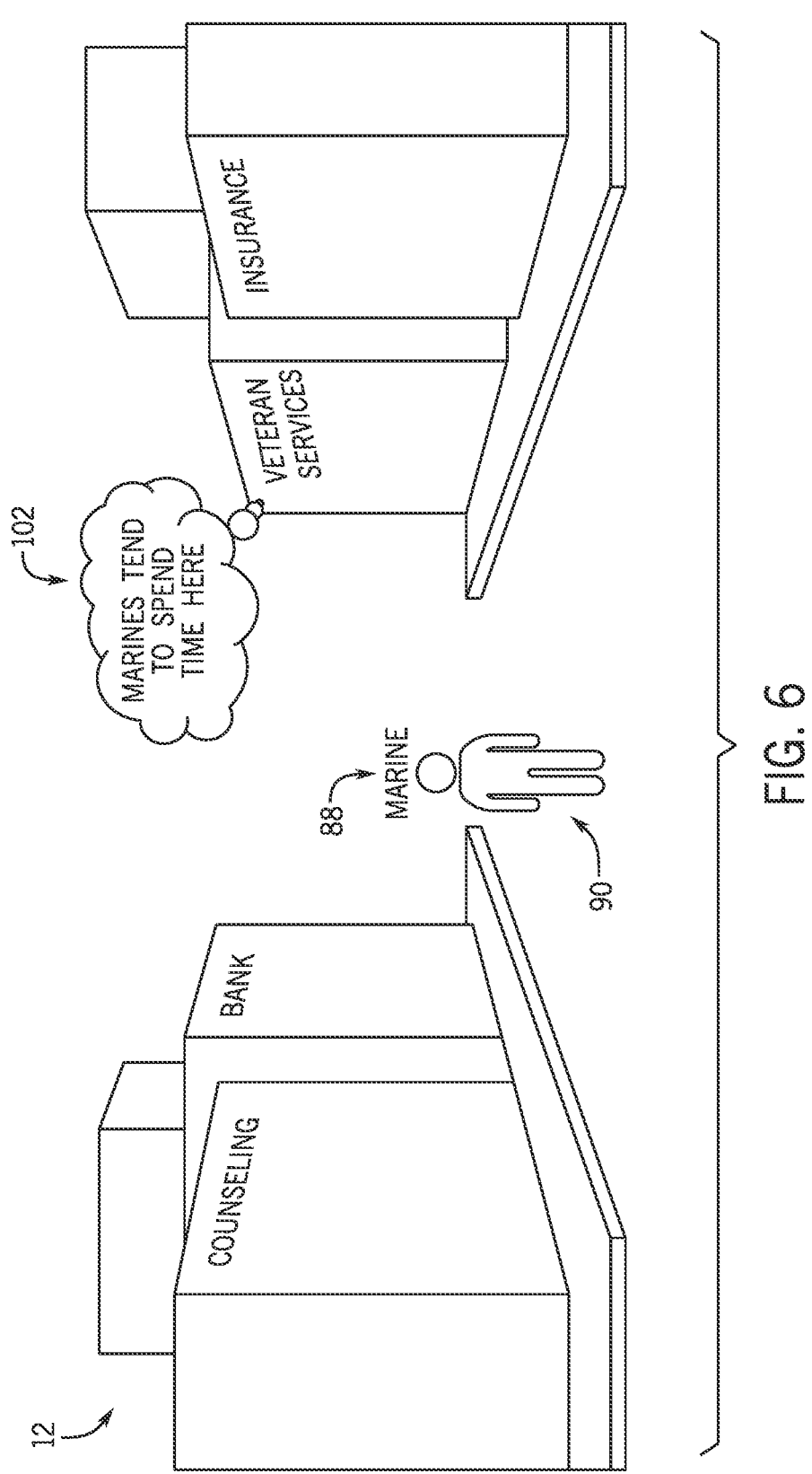
FIG. 6 illustrates a virtual message being presented to a metaverse user based on a user affiliation of the metaverse user, in accordance with embodiments described herein.

Furthermore, in certain embodiments, information relating to detected metaverse activity 22 of other users 16 having similar affiliations may be freely viewable (albeit, anonymously) even if the particular users 16 associated with the detected metaverse activity 22 do not wish for their particular identities to be known. As such, the embodiments described herein enable a greater amount of affiliation-related information 24 to be distributed even if the users 16 sharing the affiliations do not know each other's particular identities. Indeed, in certain embodiments, the detected metaverse activity 22 may be somewhat general in nature, such as detection that users 16 that used to be with a particular branch in the military tend to spend an inordinate amount of time (e.g., a percentage of time greater than a predetermined threshold percentage of time, such as greater than 5% of their time) in a particular area of a metaverse 12, as illustrated by the virtual message 102 in FIG. 6. Such information may be beneficial to a user 16 sharing that affiliation, despite the fact that they are presented with this information without knowing any particular users 16 for which the metaverse activity 22 was collected.

Figure 7:
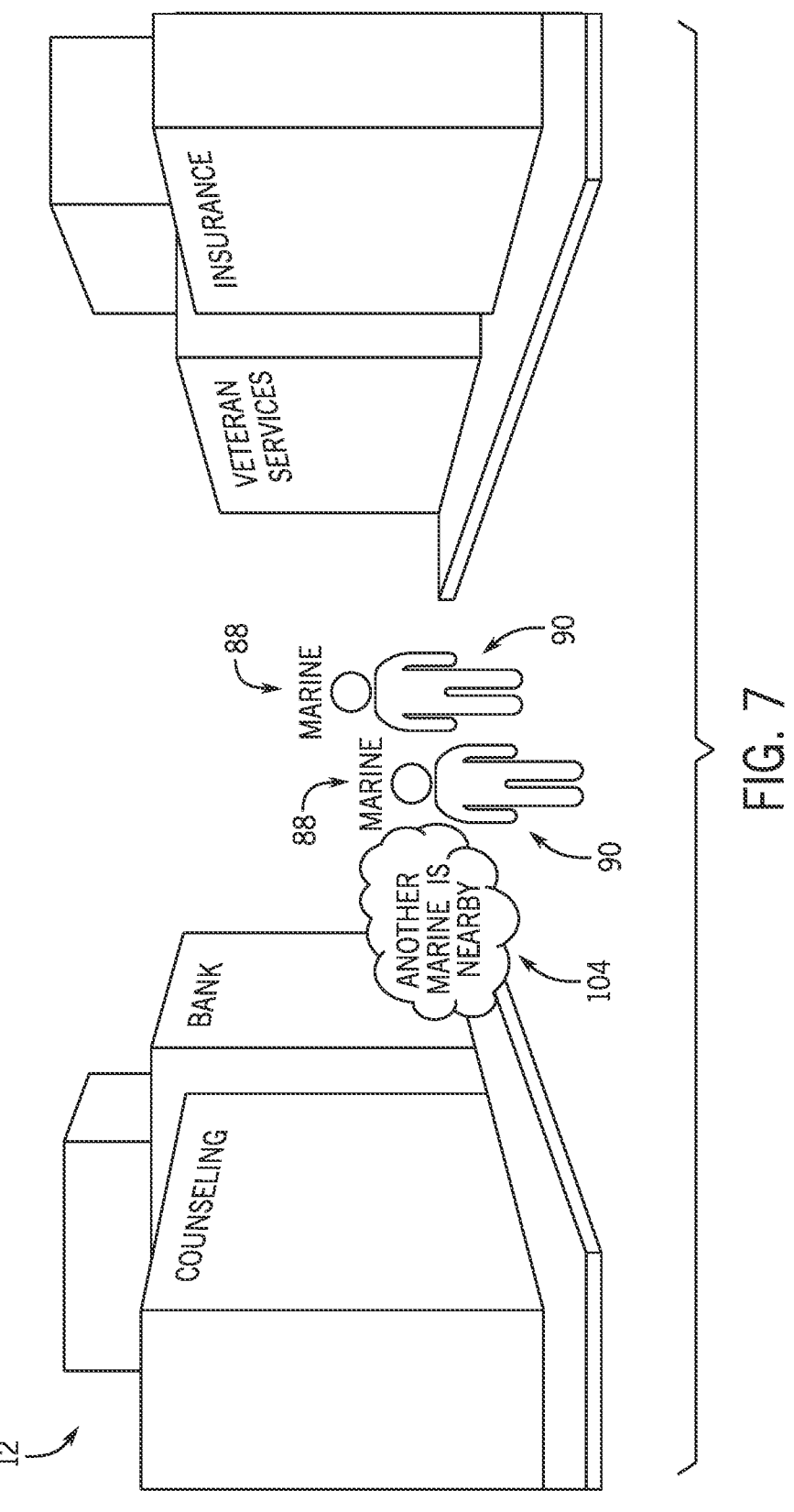
FIG. 7 illustrates a virtual alert being presented to a metaverse user when another metaverse user sharing a user affiliation is nearby in the metaverse, in accordance with embodiments described herein.

In addition, as illustrated in FIG. 7, in certain embodiments, virtual alerts 104 may be provided to users 16 when there are other users 16 who share affiliations are in relative proximity (e.g., within a predetermined virtual range) within a particular metaverse 12 (e.g., within a predetermined virtual range relative to the virtual world of the particular metaverse 12). For example, if a particular user 16 is a former Marine and there is another user 16 that is also a former Marine within 5 virtual feet, an alert 104 may be provided. It will be appreciated that every user 16 may have many different characteristics (e.g., that may be used to determine their affiliations) that define them. As such, getting these different badges 88 (or other visual indications) to show up as part of their avatars 90 may take up a lot of space. As such, in certain embodiments, to minimize the display of such badges 88 (and other visual indications), only relevant badges (or other visual indications) may be visible to other users 16, for example, those that are indicative of shared affiliations between the users 16. In addition, in certain embodiments, certain affiliation information 24 may be blurred out under certain circumstances (e.g., when a viewing user 16 does not have access to see the particular affiliation information 24, but does have access to see that such affiliation information 24 exists).

In addition, in certain embodiments, an authentication component could be utilized by the metaverse user affiliation system 26 to ensure that all affiliations manually entered by users 16 are correct. For example, if a particular user 16 manually enters that they are a former Marine, the metaverse user affiliation system 26 may authenticate (e.g., via an external data source 42) that the user 16 is, indeed, a former Marine. Furthermore, in certain embodiments, the metaverse user affiliation system 26 may analyze detected metaverse activity 22 for users 16 having similar affiliations to determine whether these affiliated users 16 are visiting similar areas of metaverses 12, interacting with similar services provided within the metaverses 12, and so forth, so that the metaverse user affiliation system 26 may share this affiliation information 24 with other users 16 sharing those affiliations.

Figure 8:
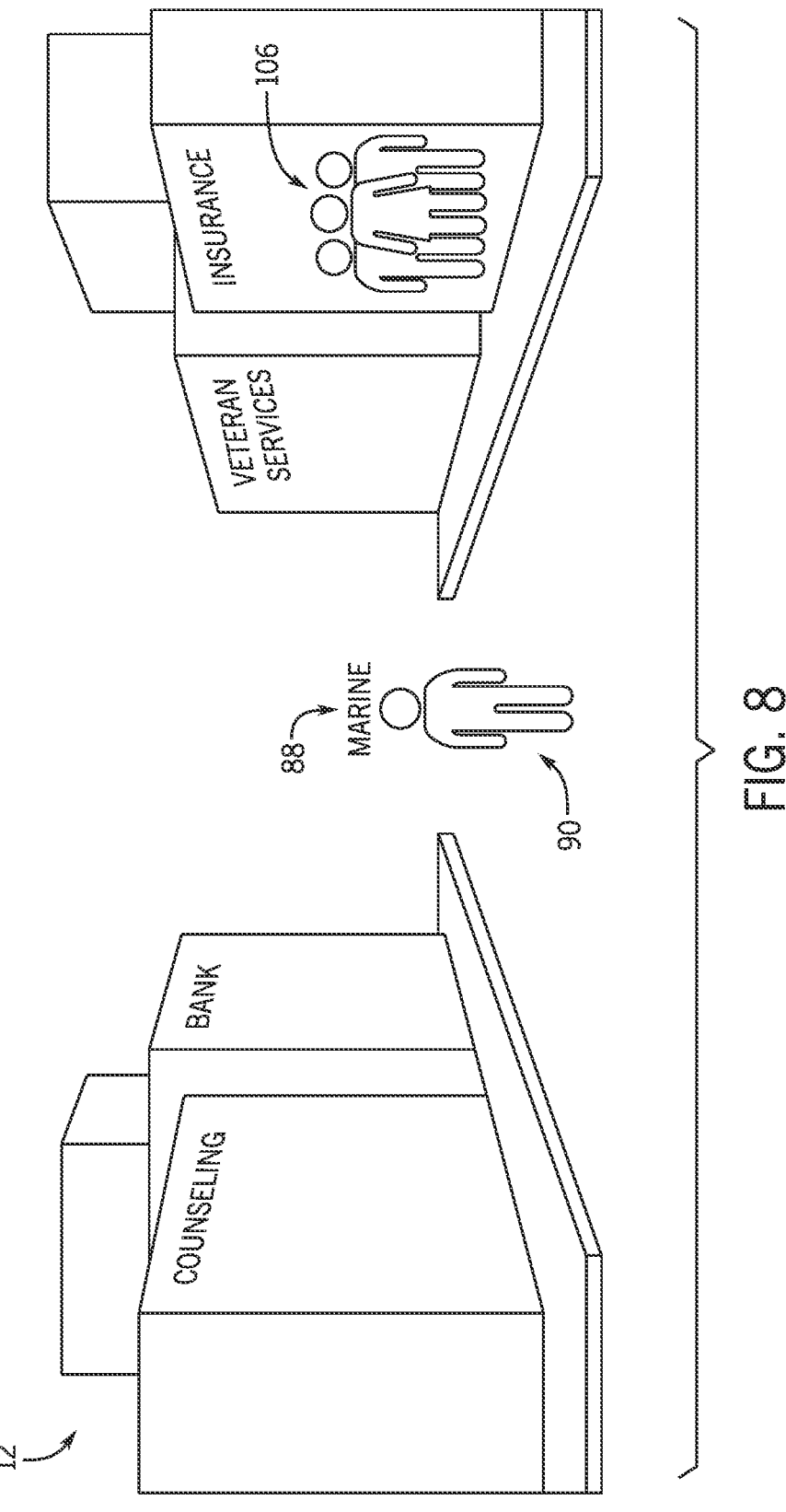
FIG. 8 illustrates a group of metaverse users that are associated with a particular organization, in accordance with embodiments described herein.

In addition, in certain embodiments, the metaverse user affiliation system 26 may use proximity of users 16 in a metaverse 12 to represent an affiliation. For example, example, as illustrated in FIG. 8, users 16 associated with a particular organization may primarily be found in particular areas of a metaverse 12 such that other users 16 may see these affiliated users 16 as a group 106 of users 16 that are associated with the particular organization (e.g., an insurance company in the illustrated embodiment). Indeed, in certain embodiments, the affiliated users 16 associated with the particular organization may be visualized as being located within different buildings within the metaverse 12 (e.g., as separate but related entities) that, for example, relate to different services provided by the organization that may be of interest to a particular user 16 (e.g., based on affiliations of the user 16). In addition, in certain embodiments, external partners associated with the particular organization may also be represented in the metaverse 12.

Figure 9:
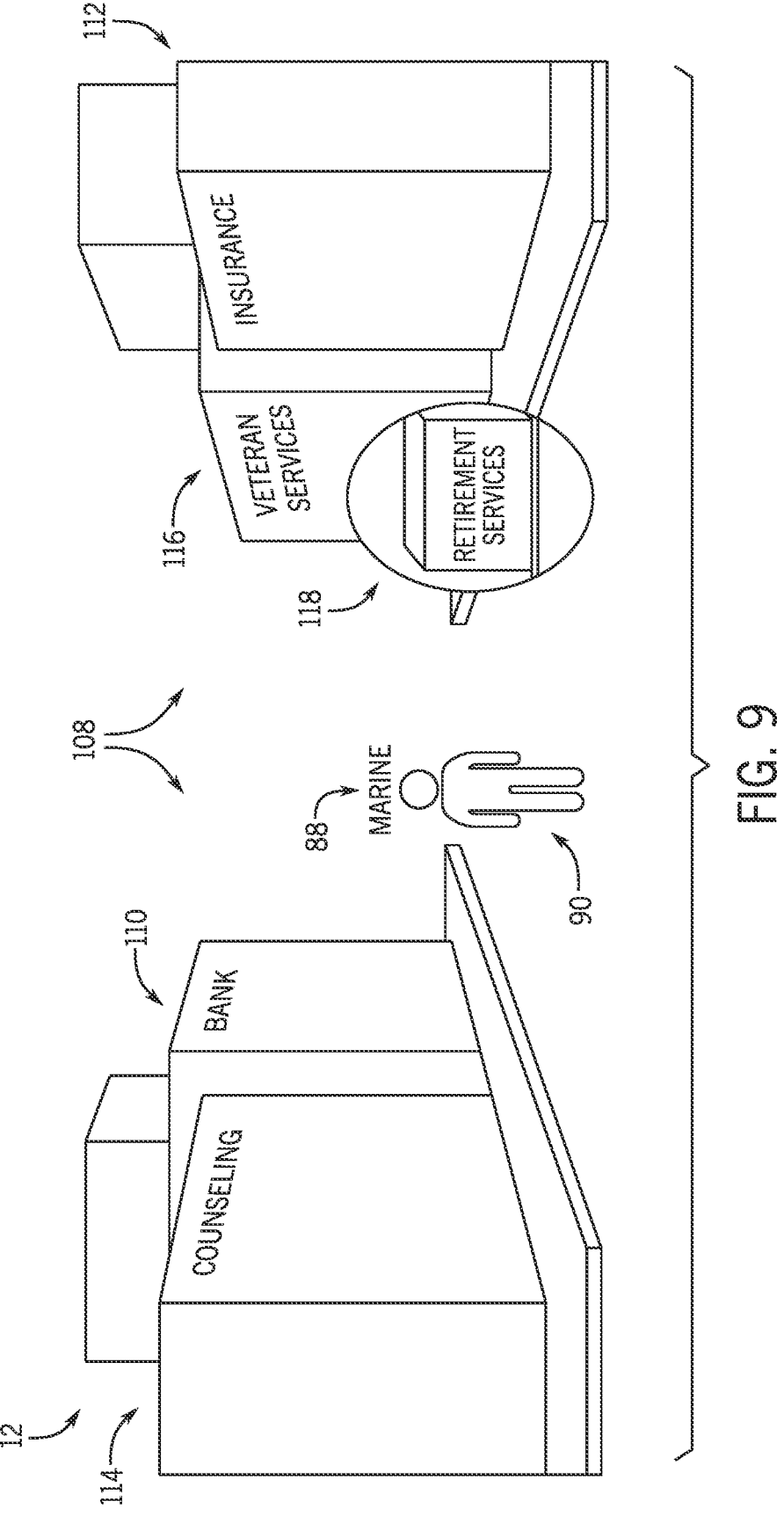
FIG. 9 illustrates a virtual complex of virtual buildings associated with a particular organization, in accordance with embodiments described herein.

In addition, in certain embodiments, a virtual complex 108 may be represented in a metaverse 12 to show different subdivisions within the particular organization to which certain users 16 are affiliated. For example, as illustrated in FIG. 9, in certain embodiments, a virtual bank 110 may be represented as a banking subdivision of the particular organization, a virtual insurance office 112 may be represented as an insurance subdivision of the particular organization, or a virtual counseling office 114 may be represented as a counseling subdivision of the particular organization, and so forth, as separate virtual buildings associated with the particular organization and represented in the metaverse 12. Furthermore, in certain embodiments, external partners 116 (e.g., a veterans services entity in the illustrated embodiment) associated with the particular organization may also have virtual buildings represented in close proximity to (or, part of) the virtual complex 108 of the particular organization. In addition, in certain embodiments, fast travel points may be represented virtually with the metaverse 12 to enable users 16 to fast travel to certain locations associated with the particular organization (e.g., through virtual portals 118).

Figure 10:
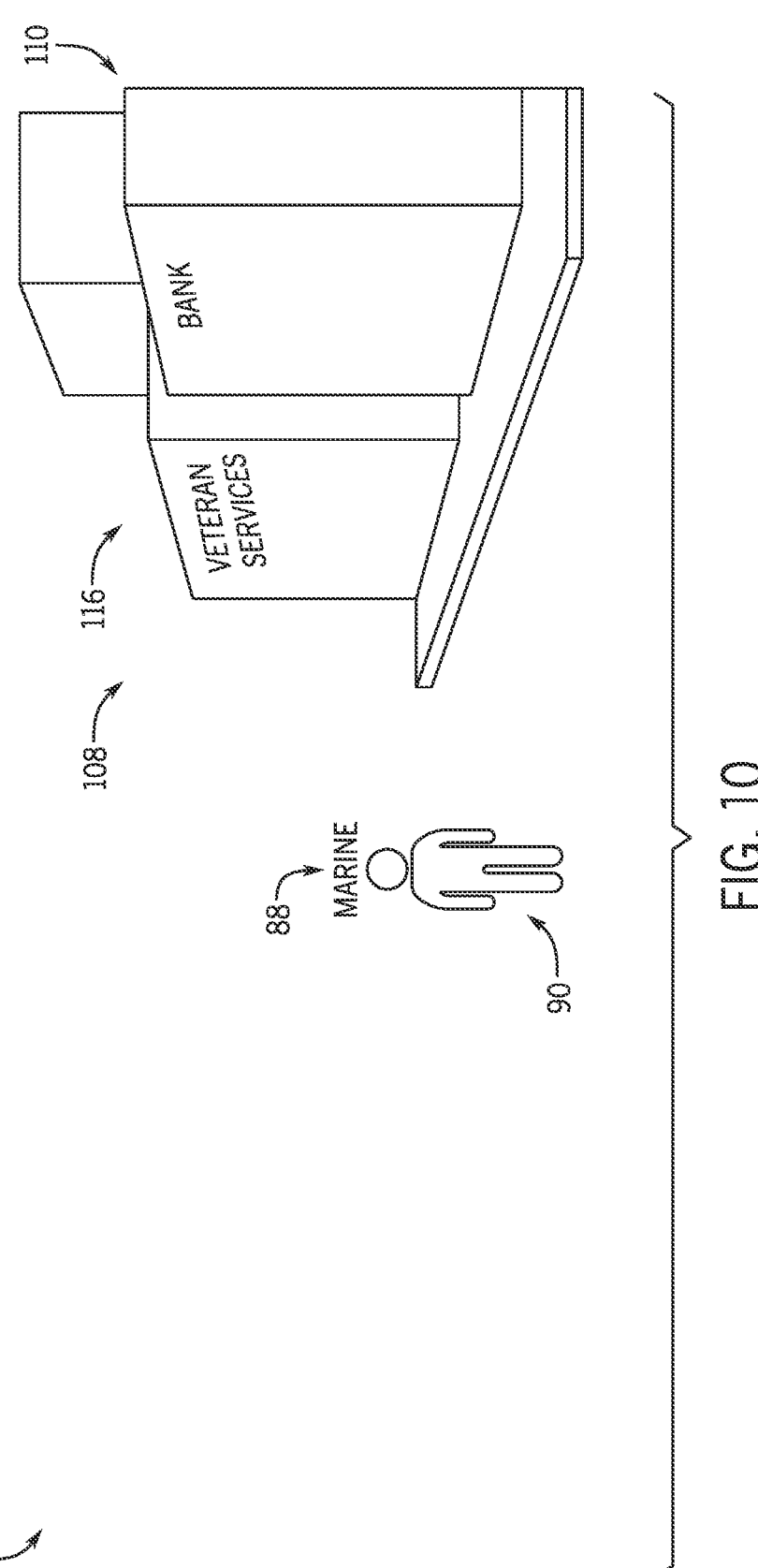
FIG. 10 illustrates a virtual complex of virtual buildings associated with a particular organization that has been modified based on interest of a metaverse user, in accordance with embodiments described herein.

In addition, in certain embodiments, different levels of hierarchy of the particular organization may be virtually represented in the metaverse 12 (e.g., which divisions certain users 16 are affiliated with, where in the real world geographically the users 16 are actually located, and so forth). In addition, in certain embodiments, the virtual world (e.g., the virtual complex 108 associated with the particular organization) may be changed based on the context of an interest of the user 16 interacting with the particular organization. For example, as illustrated in FIG. 10, the virtual complex 108 illustrated in FIG. 9 could be modified such that only subdivisions of interest to the particular user 16 (e.g., based either on their affiliations or preferences of the user 16 that are manually entered using a computing device 20) are virtually represented in the virtual world (e.g., in the illustrated embodiment, the virtual insurance office 112 and the virtual counseling office 114 have been removed, and the virtual bank 110 has been relocated to simplify the virtual complex 108).

Figure 11:
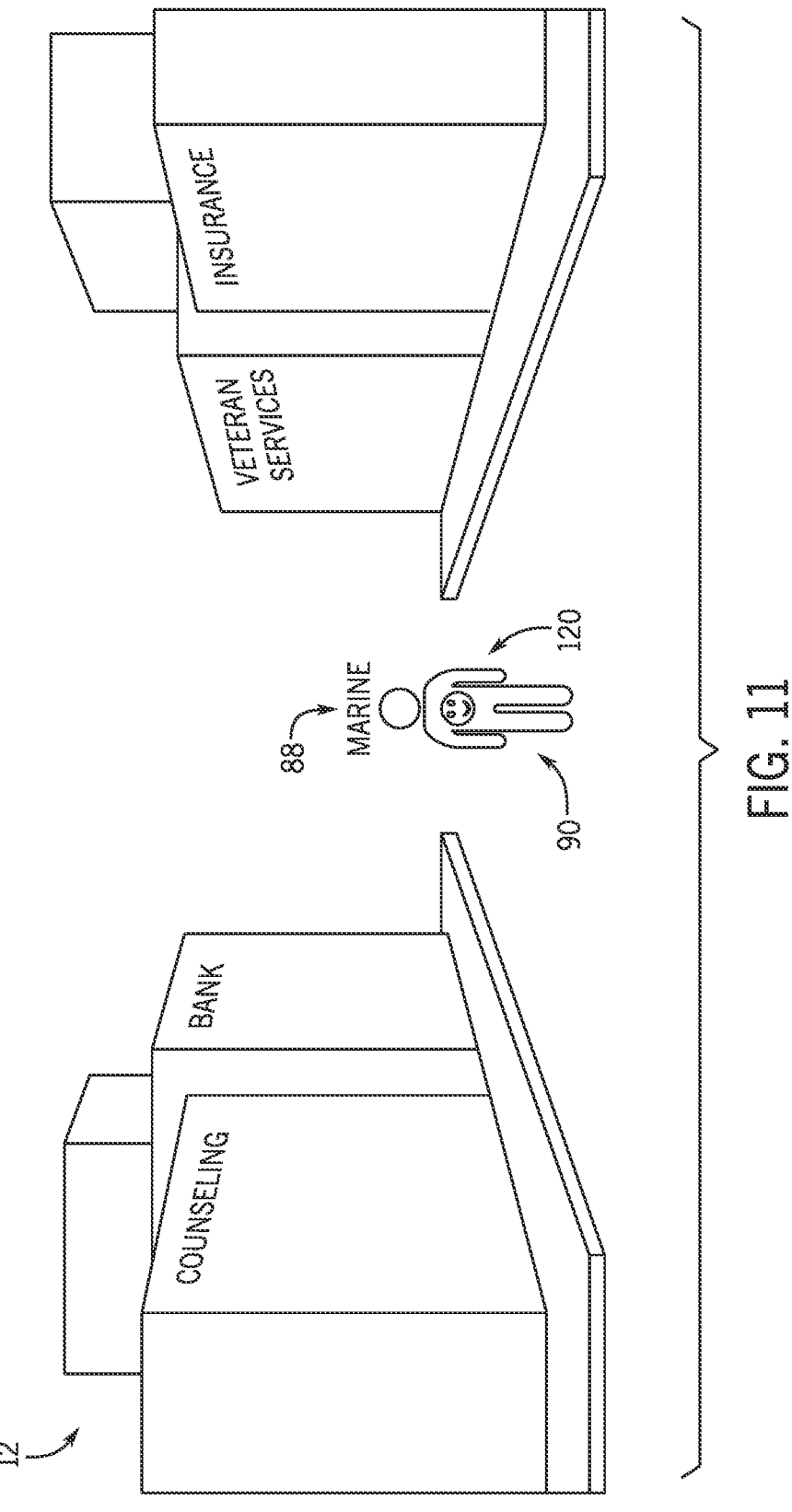
FIG. 11 illustrates a metaverse user wearing virtual apparel as advertising, in accordance with embodiments described herein.

In addition, in certain embodiments, an incentivization component may be utilized by the metaverse user affiliation system 26 wherein users 16 could be paid money (or otherwise rewarded, for example, by acquiring points) to wear virtual apparel 120 in the metaverse 12 as advertising, as illustrated in FIG. 11. In other embodiments, only users 16 that have performed certain tasks (e.g., taking training classes) may be rewarded with certain virtual apparel 120. Furthermore, in certain embodiments, certain virtual apparel or virtual badges may be awarded to certain users 16 based on long time service (e.g., receiving a virtual 50-year sticker for 50 years of service with the particular organization). In addition, in certain embodiments, users 16 may be rewarded with real-world rewards based on points rewarded in the metaverse 12.

Figure 12:
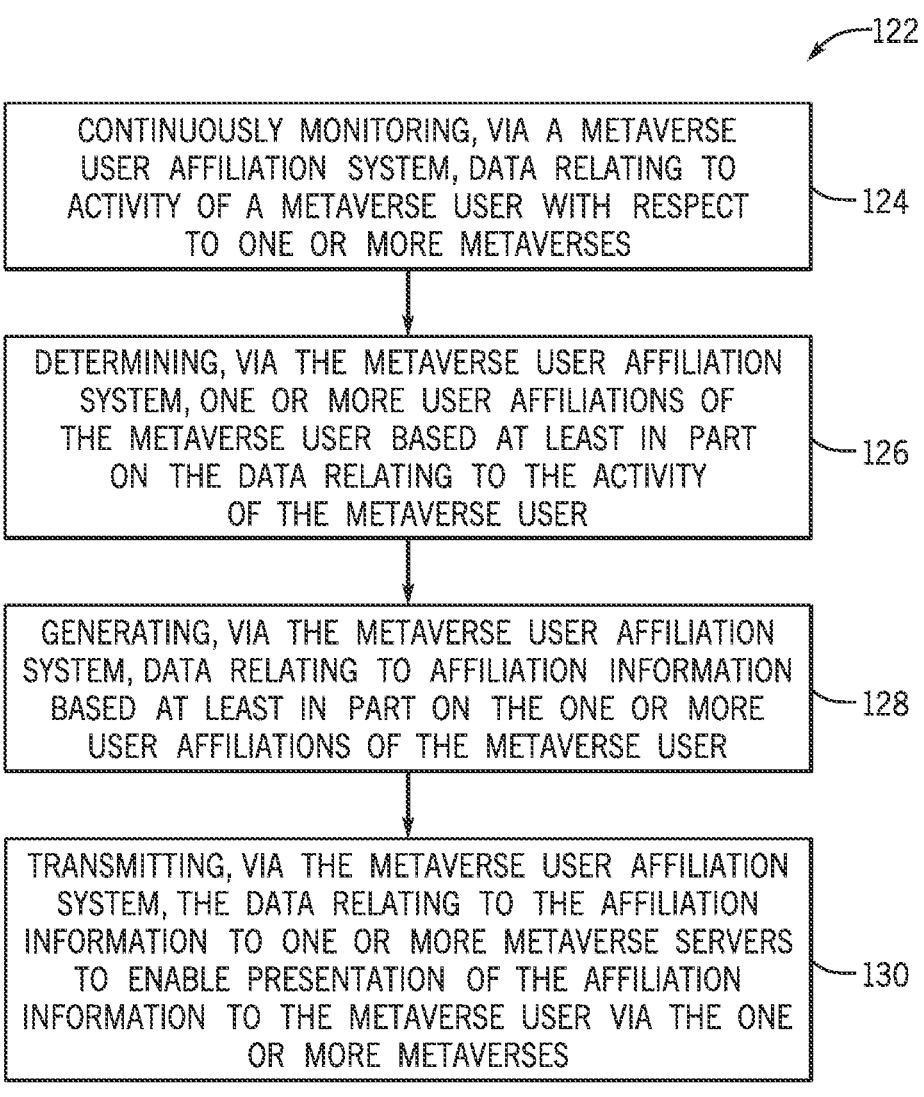
FIG. 12 is a flow diagram of a method for using a metaverse user affiliation system, in accordance with embodiments described herein.

FIG. 12 is a flow diagram of a method 122 for using the metaverse user affiliation system 26 described herein. In certain embodiments, the method 122 may include continuously monitoring, via the metaverse user affiliation system 26, data relating to activity 22 of a metaverse user 16 with respect to one or more metaverses 12 (block 124). In addition, in certain embodiments, the method 122 may include determining, via a metaverse user affiliation system 26, one or more user affiliations of the metaverse user 16 based at least in part on the data relating to the activity 22 of the metaverse user 16 (block 126). In addition, in certain embodiments, the method 122 may include generating, via the metaverse user affiliation system 26, data relating to affiliation information 24 based at least in part on the one or more user affiliations of the metaverse user 16 (block 128). In addition, in certain embodiments, the method 122 may include transmitting, via the metaverse user affiliation system 26, the data relating to the affiliation information 24 to one or more metaverse servers 14 to enable presentation of the affiliation information 24 to the metaverse user 16 via the one or more metaverses 12 (block 130).

In certain embodiments, the data relating to the activity 22 of the metaverse user 16 includes data relating to interactions of the metaverse user 16 with the one or more metaverses 12. In addition, in certain embodiments, the data relating to the activity 22 of the metaverse user 16 includes data manually entered by the metaverse user 16 via one or more computing devices 20.

In certain embodiments, the affiliation information 24 includes one or more visual representations 88 indicative of the one or more user affiliations of the metaverse user 16 to be associated with one or more avatars 90 of one or more other metaverse users 16 presented to the metaverse user 16 via the one or more metaverses 12. The one or more other metaverse users 16 share at least one user affiliation of the one or more user affiliations with the metaverse user 16. In certain embodiments, the method 122 may include generating, via the metaverse user affiliation system 26, the data relating to the affiliation information 24 based at least in part on one or more privacy levels 92 manually entered by the one or more other metaverse users 16 via one or more computing devices 20.

In certain embodiments, the affiliation information 24 includes a virtual indication 102 that an area of the one or more metaverses 12 is frequently visited by one or more other metaverse users 16 that share at least one user affiliation of the one or more user affiliations with the metaverse user 16. In addition, in certain embodiments, the affiliation information 24 includes a virtual alert 104 that one or more other metaverse users 16 that share at least one user affiliation of the one or more user affiliations with the metaverse user 16 are currently in relative proximity to the metaverse user 16 in a metaverse 12 of the one or more metaverses 12. In addition, in certain embodiments, the affiliation information 24 includes a virtual indication that one or more other metaverse users 16 comprise a group 106 of metaverse users 16 that are associated with a particular organization of interest to the metaverse user 16. In addition, in certain embodiments, the affiliation information 24 includes a virtual complex 108 of virtual buildings 110, 112, 114, 116 that are associated with a particular organization of interest to the metaverse user 16. A combination of the virtual buildings 110, 112, 114, 116 changes over time based at least in part on the one or more user affiliations of the metaverse user 16.

In addition, in certain embodiments, the method 122 may include storing, via the metaverse user affiliation system 26, the data relating to the activity 22 of the metaverse user 16 and/or the data relating to the affiliation information 24 in a distributed ledger (e.g., a blockchain network) 54.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

It should be appreciated that any of the features and embodiments described herein may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A method, comprising:

continuously monitoring, via a metaverse user affiliation system, data relating to activity of a metaverse user with respect to one or more metaverses, wherein the data relating to the activity of the metaverse user with respect to the one or more metaverses comprises data relating to one or more interactions of the metaverse user with a virtual complex of virtual buildings that provide metaverse users with real-world services in the one or more metaverses;

determining, via the metaverse user affiliation system, one or more military affiliations of the metaverse user based at least in part on the data relating to the activity of the metaverse user;

rearranging, via the metaverse user affiliation system, the virtual buildings of the virtual complex presented to the metaverse user via the one or more metaverses based at least in part on the one or more military affiliations of the metaverse user and based at least in part on the data relating to the activity of the metaverse user;

modifying, via the metaverse user affiliation system, one or more avatars of one or more other metaverse users presented to the metaverse user via the one or more metaverses to include a visual representation that the one or more other metaverse users share at least one military affiliation with the metaverse user;

generating, via the metaverse user affiliation system, data relating to military affiliation information based at least in part on the one or more military affiliations of the metaverse user;

storing, via the metaverse user affiliation system, the data relating to the activity of the metaverse user and the data relating to the military affiliation information in a blockchain network;

utilizing, via the metaverse user affiliation system, a data conversion protocol to convert the data relating to the military affiliation information into a metaverse data format specific to the one or more metaverses; and transmitting, via the metaverse user affiliation system, the converted data relating to the military affiliation information to one or more metaverse servers to enable presentation of the military affiliation information to the metaverse user via the one or more metaverses.

2. The method of claim 1, wherein the data relating to the activity of the metaverse user comprises data relating to interactions of the metaverse user with the one or more metaverses.

3. The method of claim 1, wherein the data relating to the activity of the metaverse user comprises data manually entered by the metaverse user via one or more computing devices.

4. The method of claim 1, comprising generating, via the metaverse user affiliation system, the data relating to the military affiliation information based at least in part on one or more privacy levels manually entered by the one or more other metaverse users via one or more computing devices.

5. The method of claim 1, wherein the military affiliation information comprises a virtual indication that an area of the one or more metaverses is frequently visited by one or more other metaverse users that share at least one military affiliation of the one or more military affiliations with the metaverse user.

6. The method of claim 1, wherein the military affiliation information comprises a virtual alert that one or more other metaverse users that share at least one military affiliation of the one or more military affiliations with the metaverse user are currently in relative proximity to the metaverse user in a metaverse of the one or more metaverses.

7. The method of claim 1, wherein the military affiliation information comprises a virtual indication that one or more other metaverse users comprise a group of metaverse users that are associated with a particular organization of interest to the metaverse user.

8. The method of claim 1, wherein the virtual buildings of the virtual complex comprise a virtual bank for providing real-world banking services for the metaverse users in the one or more metaverses.

9. The method of claim 1, wherein the virtual buildings of the virtual complex comprise a virtual insurance office for providing real-world insurance services for the metaverse users in the one or more metaverses.

10. The method of claim 1, wherein the virtual buildings of the virtual complex comprise a virtual counseling office for providing real-world counseling services for the metaverse users in the one or more metaverses.

11. The method of claim 1, wherein the virtual buildings of the virtual complex comprise a veterans services office for providing real-world veterans services for the metaverse users in the one or more metaverses.

12. The method of claim 3, wherein the data relating to the activity of the metaverse user comprises a particular branch of military with which the metaverse user served, whether the metaverse user is currently on active duty with the particular branch of the military, years of service of the metaverse user with the particular branch of the military, year ranges that the metaverse user served with the particular branch of the military, or some combination thereof.

13. A metaverse user affiliation system, comprising:

one or more processors configured to execute instructions stored in memory, wherein the instructions, when executed by the one or more processors, are configured to cause the metaverse user affiliation system to:

continuously monitor data relating to activity of a metaverse user with respect to one or more metaverses, wherein the data relating to the activity of the metaverse user with respect to the one or more metaverses comprises data relating to one or more interactions of the metaverse user with a virtual complex of virtual buildings that provide metaverse users with real-world services in the one or more metaverses;

determine one or more military affiliations of the metaverse user based at least in part on the data relating to the activity of the metaverse user;

rearrange the virtual buildings of the virtual complex presented to the metaverse user via the one or more metaverses based at least in part on the one or more military affiliations of the metaverse user and based at least in part on the data relating to the activity of the metaverse user;

modify one or more avatars of one or more other metaverse users presented to the metaverse user via the one or more metaverses to include a visual representation that the one or more other metaverse users share at least one military affiliation with the metaverse user;

generate data relating to military affiliation information based at least in part on the one or more military affiliations of the metaverse user;

store the data relating to the activity of the metaverse user and the data relating to the military affiliation information in a blockchain network;

utilize a data conversion protocol to convert the data relating to the military affiliation information into a metaverse data format specific to the one or more metaverses; and transmit the converted data relating to the military affiliation information to the one or more metaverses to enable presentation of the military affiliation information to the metaverse user via the one or more metaverses.

14. The metaverse user affiliation system of claim 13, wherein the data relating to the activity of the metaverse user comprises data relating to interactions of the metaverse user with the one or more metaverses.

15. The metaverse user affiliation system of claim 13, wherein the data relating to the activity of the metaverse user comprises data manually entered by the metaverse user via one or more computing devices.

16. The metaverse user affiliation system of claim 13, wherein the instructions, when executed by the one or more processors, are configured to cause the metaverse user affiliation system to generate the data relating to the military affiliation information based at least in part on one or more privacy levels manually entered by the one or more other metaverse users via one or more computing devices.

17. The metaverse user affiliation system of claim 13, wherein the military affiliation information comprises a virtual indication that an area of the one or more metaverses is frequently visited by one or more other metaverse users that share at least one military affiliation of the one or more military affiliations with the metaverse user.

18. The metaverse user affiliation system of claim 12, wherein the military affiliation information comprises a virtual alert that one or more other metaverse users that share at least one military affiliation of the one or more military affiliations with the metaverse user are currently in relative proximity to the metaverse user in a metaverse of the one or more metaverses.

19. The metaverse user affiliation system of claim 15, wherein the data relating to the activity of the metaverse user comprises a particular branch of military with which the metaverse user served, whether the metaverse user is currently on active duty with the particular branch of the military, years of service of the metaverse user with the particular branch of the military, year ranges that the metaverse user served with the particular branch of the military, or some combination thereof.

20. A metaverse generation system, comprising:

a metaverse user affiliation system configured to:

continuously monitor data relating to activity of a metaverse user with respect to one or more metaverses, wherein the data relating to the activity of the metaverse user with respect to the one or more metaverses comprises data relating to one or more interactions of the metaverse user with a virtual complex of virtual buildings that provide metaverse users with real-world services in the one or more metaverses;

determine one or more military affiliations of the metaverse user based at least in part on the data relating to the activity of the metaverse user;

rearrange the virtual buildings of the virtual complex presented to the metaverse user via the one or more metaverses based at least in part on the one or more military affiliations of the metaverse user and based at least in part on the data relating to the activity of the metaverse user;

modify one or more avatars of one or more other metaverse users presented to the metaverse user via the one or more metaverses to include a visual representation that the one or more other metaverse users share at least one military affiliation with the metaverse user;

generate data relating to military affiliation information based at least in part on the one or more military affiliations of the metaverse user;

store the data relating to the activity of the metaverse user and the data relating to the military affiliation information in a blockchain network;

utilize a data conversion protocol to convert the data relating to the military affiliation information into a metaverse data format specific to the one or more metaverses; and transmit the converted data relating to the military affiliation information to enable presentation of the military affiliation information to the metaverse user via the one or more metaverses; and one or more metaverse servers configured to:

receive the converted data relating to the military affiliation information; and present the military affiliation information to the metaverse user via the one or more metaverses.

* * * * *